11,11a - DIHYDRO - 2 - (LOWER ALKYL) - 6 - HYDROXY - 6H - BENZO[5,6]CYCLOHEPT - [1,2,3-cd]INDOLIN-1-ONES

Janis Plostnieks, Philadelphia, Pa., assignor to McNeil Laboratories, Inc., a corporation of Pennsylvania
No Drawing. Filed May 2, 1967, Ser. No. 635,348
U.S. Cl. 260—326.5
Int. Cl. C07d 27/56; A61k 27/00
5 Claims

ABSTRACT OF THE DISCLOSURE 11,11a-dihydro-2- (lower alkyl) - 6-hydroxy-6H-benzo [5,6]cyclohept-[1,2,3,-cd]indolin-1-ones useful as central nervous system depressants.

---

This is a continuation-in-part application of my copending application Ser. No. 502,272, filed Oct. 22, 1965 now abandoned.

This invention relates to novel organic compounds and to the preparation thereof, and, more particularly, to 11,11a - dihydro - 2 - (lower alkyl) - 6-hydroxy-6H-benzo [5,6]cyclohept-[1,2,3-cd]indolin-1-ones which may be represented by the following structural formula:

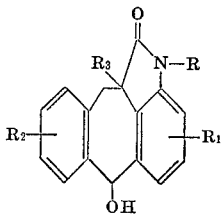

(I)

wherein R is lower alkyl; $R_1$ is a member selected from the group consisting of hydrogen, lower alkyl, lower alkoxy and halo; $R_2$ is a member selected from the group consisting of hydrogen, halo and lower alkoxy; and $R_3$ is a member selected from the group consisting of hydrogen and lower alkyl.

As used herein, lower alkyl and lower alkoxy preferably have from 1 to 5 carbon atoms, including straight or branched saturated aliphatic chains, such as, for example, methyl, ethyl, propyl, isopropyl, butyl, isobutyl, secondary-butyl, pentyl and the like, and respectively, methoxy, ethoxy, propoxy, isopropoxy, etc.; and halo includes chloro, bromo, fluoro and iodo.

The subject compounds (I) may be advantageously prepared by using a 2-(lower alkyl)-6H-benzo[5,6] cyclohept[1,2,3-cd]indolin-1,6-dione of Formula II as the starting material. The starting materials II are disclosed in, and may be prepared according to the processes described in, my copending application Serial No. 502,271. Saturation of the double bond in the 11,11a position and reduction of the oxo function in the 6-position to hydroxyl to form the novel compounds of Formula I–a may be accomplished by treating II with an alkali metal borohydride in, preferably, a lower alkanol solvent, e.g., methanol, ethanol, isopropanol and the like.

Compounds of Formula I–b, wherein a lower alkyl group is in the 11a position, may be obtained by alkylation of I–a with a lower alkyl halide, preferably the iodide, in a suitable organic solvent and in the presence of a halogen acid acceptor, e.g., sodium or potassium carbonate, to bind the halogen acid that is liberated during the course of the reaction. Among the organic solvents that are operable herein are aromatic hydrocarbons such as toluene, benzene, xylene and the like; lower alkanols such as methanol, ethanol and the like; and preferably, lower alkanones such as acetone, butanone, 4-methyl-2-pentanone and the like.

The foregoing reactions may be illustrated by the following schematic diagram, wherein R, $R_1$ and $R_2$ are as previously described:

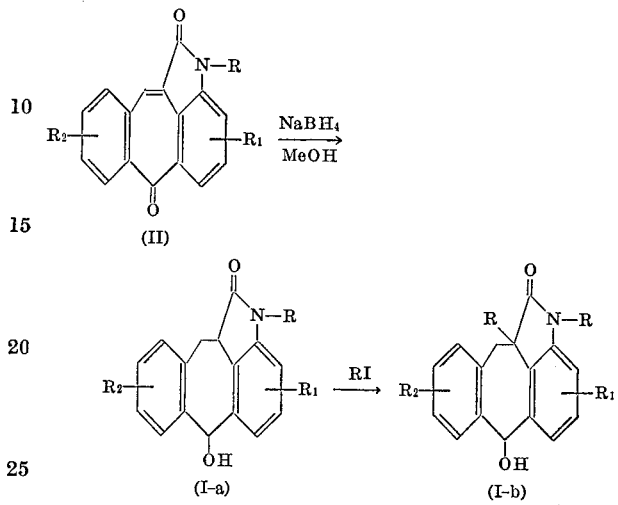

Due to the structural configuration of the subject compounds, it is evident that their existence in the form of several stereoisomers is possible. It is naturally intended that all such isomers are included within the scope of this invention.

The following examples are intended to illustrate, but not to limit, the scope of the present invention.

EXAMPLE I 2-methyl - 6H-benzo [5,6] cyclohept [1,2,3-cd] indolin-1,6-dione (10 g., 0.038 mole) is suspended in 500 ml. of methanol. To this suspension, in an ice bath with stirring, is added 12 g. (0.32 mole) of sodium borohydride over a period of 1 hour. A tan solid is filtered off and recrystallized from pyridine-water, giving 11,11a-dihydro-2-methyl-6-hydroxy-6H-benzo[5,6]cyclohept-[1,2,3-cd]indolin - 1-one; M.P. 208–211° C. A second recrystallization from pyridine-water raises the M.P. to 210–213° C.

Analysis.—Calculated for: $C_{17}H_{15}NO_2$: C, 76.96; H, 5.70; N, 5.28%. Found: C, 76.83; H, 5.80; N, 5.46%.

EXAMPLE II

The procedure of Example I is followed except that an equivalent quantity of the 2-ethyl, 2,3-dimethyl, 2-methyl-4-ethoxy, 2-methyl-5-chloro, 2-ethyl-10-methoxy, 2-ethyl-8-chloro, 2-methyl-5-chloro-10-methoxy and 2-methyl-4-ethoxy-8-chloro derivative, respectively, of 6H-benzo [5,6]cyclohept[1,2,3-cd]indolin-1,6-dione is used in place of the starting dione used therein to yield, as respective products, the corresponding 2-ethyl, 2,3-dimethyl, 2-methyl-4-ethoxy, 2-methyl-5-chloro, 2-ethyl-10-methoxy, 2-ethyl-8-chloro, 2-methyl-5-chloro-10-methoxy and 2-methyl-4-ethoxy-8-chloro derivatives of 11,11a-dihydro-6-hydroxy-6H-benzo[5,6]cyclohept - [1,2,3-cd]indolin - 1 - one.

EXAMPLE III 11,11a-dihydro-2-methyl-6-hydroxy-6H-benzo [5,6] cyclohept[1,2,3-cd]indolin-1-one (17.5 g., 0.065 mole) is suspended in 200 ml. of acetone. To this suspension, in an ice bath with stirring, is added 10 g. (0.072 mole) of potassium carbonate and 25 ml. of methyl iodide. The reaction is stirred for 5 days at room temperature. A white solid is filtered off. The acetone is evaporated in vacuo leaving a solid residue. The two solids are combined and suspended in methylene chloride and washed with water. The neutral layer is dried over anhydrous magnesium sulfate and filtered. Evaporation of the solvent in vacuo yields a yellow semi-solid which crystallizes upon the addition of a benzenehexane mixture as a light yellow solid, 11,11a-dihydro-2, 11a-dimethyl-6-dydroxy-6H-benzo[5,6] cyclohept [1,2,3-cd] indolin-1-one; M.P. 161–171°C.

*Analysis.*—Calculated for: $C_{18}H_{17}NO_2$: C, 77.39; H, 6.13%; N, 5.01%. Found: C, 77.73; H, 6.22; N,*4.95%*.

EXAMPLE IV

By following the procedure of Example III, except that an equivalent quantity of ethyl iodide is used instead of the methyl iodide used therein, there is obtained 11,11a-dihydro-6-hydroxy-2-methyl-11a-ethyl-6H-benzo [5,6] cyclohept[1,2,3-cd]indolin-1-one.

EXAMPLE V

In accordance with the procedures of Examples III and IV, and by starting with an equivalent quantity of the respective idolinones obtained in Example II instead of the starting indolinone used in Eamples III and IV, there are obtained, as respective products, the corresponding R—, $R_1$— and $R_2$— substituted, 11a-methyl and 11a-ethyl derivatives of 11,11a-dihydro-6-hydroxy-6H-benzo [5,6]-cyclohept[1,2,3-cd]indolin-1-one.

The compounds of this invention have valuable pharmacological properties. For example, when compounds of Formula I, wherein R is methyl, $R_1$ and $R_2$ are hydrogen and $R_3$ is hydrogen or methyl, are administered to mice intraperitoneally at a dose of 100 mg/kg. of body weight, ataxia is observed. Ataxia is used in animal tests as an indication of CNS depression. The subject compounds can be administered in conventional pharmaceutical formulations for oral and parenteral usages.

What is claimed is:
1. 11,11a-dihydro-2-(lower alkyl)-6-hydroxy-6H-benzo [5,6]cyclohept[1,2,3-cd]indolin-1-one of the formula:

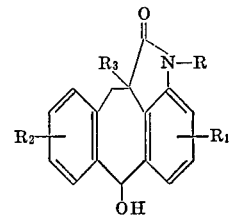

wherein R is lower alkyl; $R_1$ is a member selected from the group consisting of hydrogen, lower alkyl, lower alkoxy and halo; $R_2$ is a member selected from the group consisting of hydrogen, halo and lower alkoxy; and $R_3$ is a member selected from the group consisting of hydrogen and lower alkyl.

2. 11,11a-dihydro-2-(lower alkyl)-6-hydroxy-6H-benzo [5,6]cyclohept[1,2,3-cd]indolin-1-one.

3. 11,11a-dihydro-2-methyl-6-hydroxy-6H-benzo[5,6]-cyclohept[1,2,3-cd]indolin-1-one.

4. 11,11a-dihydro-2,11a-di-(lower alkyl)-6-hydroxy-6H-benzo[5,6]cyclohept[1,2,3-cd]indolin-1-one.

5. 11,11a-dihydro-2,11a-dimethyl-6-hydroxy-6H-benzo[5,6]cyclohept[1,2,3-cd]indolin-1-one.

No references cited.

ALEX MAZEL, *Primary Examiner.*

JOSE TOVAR, *Assistant Examiner.*

U.S. Cl. X.R.

424—274